United States Patent
Broga et al.

(10) Patent No.: US 9,869,544 B2
(45) Date of Patent: Jan. 16, 2018

(54) METHOD TO DETERMINE LENGTH AND AREA MEASUREMENTS WITHIN A SMARTPHONE CAMERA IMAGE

(71) Applicant: BlackBerry Limited, Waterloo (CA)

(72) Inventors: Antanas Matthew Broga, Cambridge (CA); Arnett Ryan Weber, Waterloo (CA); Yu Gao, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 244 days.

(21) Appl. No.: 14/473,094

(22) Filed: Aug. 29, 2014

(65) Prior Publication Data

US 2016/0061586 A1    Mar. 3, 2016

(51) Int. Cl.
*H04N 7/18* (2006.01)
*G01B 11/14* (2006.01)
(Continued)

(52) U.S. Cl.
CPC ............ *G01B 11/14* (2013.01); *G01B 11/026* (2013.01); *G01B 11/285* (2013.01);
(Continued)

(58) Field of Classification Search
CPC ... G06T 7/004; G06T 7/0057; H04N 5/23293; H04N 5/23216; H04N 7/183;
(Continued)

(56) References Cited

U.S. PATENT DOCUMENTS

2007/0121095 A1* 5/2007 Lewis .................. G01S 7/4813
                                                  356/5.01
2011/0074950 A1* 3/2011 Oka ...................... A61B 1/042
                                                  348/137
(Continued)

FOREIGN PATENT DOCUMENTS

EP          2722665         4/2014
KR       20060031730        4/2006
(Continued)

OTHER PUBLICATIONS

Extended European Search Report issued in EP Application No. 15182903.3 dated Nov. 19, 2015, 5 pages.

(Continued)

*Primary Examiner* — Jared Walker
(74) *Attorney, Agent, or Firm* — Fish & Richardson P.C.

(57) ABSTRACT

A mobile communication device includes a processor operably coupled to a memory and to a wireless communication subsystem operable to send and receive data, a camera operably coupled to the processor, a sensor operably connected to provide to the processor a distance between the camera and an element viewable by the camera. Instructions are stored in the memory; when these instructions are executed by the processor, the mobile communication device takes an image with the camera, uses the sensor to determine a distance between the camera and at least one object recorded in the image, receives a request for a desired measurement comprising one of a desired length measurement and a desired area measurement of an element in the (Continued)

image, calculates the desired measurement, and provides the desired measurement to the user.

17 Claims, 2 Drawing Sheets

(51) Int. Cl.
*G01B 11/28* (2006.01)
*G01B 11/02* (2006.01)
*H04N 5/232* (2006.01)

(52) U.S. Cl.
CPC ..... *H04N 5/23216* (2013.01); *H04N 5/23293* (2013.01); *H04N 7/183* (2013.01)

(58) Field of Classification Search
CPC ......... G01B 11/02; G01B 11/22; G01B 11/14; G01B 11/285; G01B 11/026; G01C 11/00
USPC .......................................................... 348/158
See application file for complete search history.

(56) References Cited

U.S. PATENT DOCUMENTS

| | | | | |
|---|---|---|---|---|
| 2011/0169998 A1* | 7/2011 | Canetti | .............. | H04N 5/23212 348/348 |
| 2012/0147145 A1* | 6/2012 | Yamaguchi | ........ | H04N 13/0055 348/47 |
| 2012/0170136 A1* | 7/2012 | Kubota | .................. | G03B 21/53 359/697 |
| 2012/0218418 A1* | 8/2012 | Strandemar | ............... | G01J 5/02 348/164 |
| 2012/0224052 A1* | 9/2012 | Bae | ...................... | G01B 11/026 348/135 |
| 2013/0197793 A1* | 8/2013 | Vaddadi | ................... | G06F 17/00 701/300 |
| 2013/0272578 A1* | 10/2013 | Watanabe | ............. | G06T 7/0046 382/103 |
| 2013/0308013 A1* | 11/2013 | Li | .......................... | G01S 17/89 348/231.3 |
| 2014/0027503 A1 | 1/2014 | Kennedy et al. | | |
| 2015/0062305 A1 | 3/2015 | Murayama et al. | | |

FOREIGN PATENT DOCUMENTS

| | | |
|---|---|---|
| KR | 20070009888 | 1/2007 |
| WO | 2013146269 | 10/2013 |

OTHER PUBLICATIONS

Office Action issued in Canadian Application No. 2,901,708 dated Aug. 8, 2016.

Office Action issued in Canadian Application No. 2,901,708 dated Jun. 12, 2017.

* cited by examiner

METHOD TO DETERMINE LENGTH AND AREA MEASUREMENTS WITHIN A SMARTPHONE CAMERA IMAGE

FIELD OF THE DISCLOSURE

The present patent disclosure generally relates to the use of cameras in mobile communication devices. More particularly, and not by way of any limitation, the present patent disclosure is directed to a mobile communication device and method for determining length and area measurements in an image taken by a camera on a mobile communication device.

BACKGROUND

Cell phones and/or tablets are increasingly the device of choice for many for access to data communication networks and for voice communication. Simultaneously with the trend towards smaller, lighter, power-conserving devices is the trend for increasing capabilities in the mobile communication devices. These conflicting demands can provide challenges for those who design and implement mobile communication devices.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
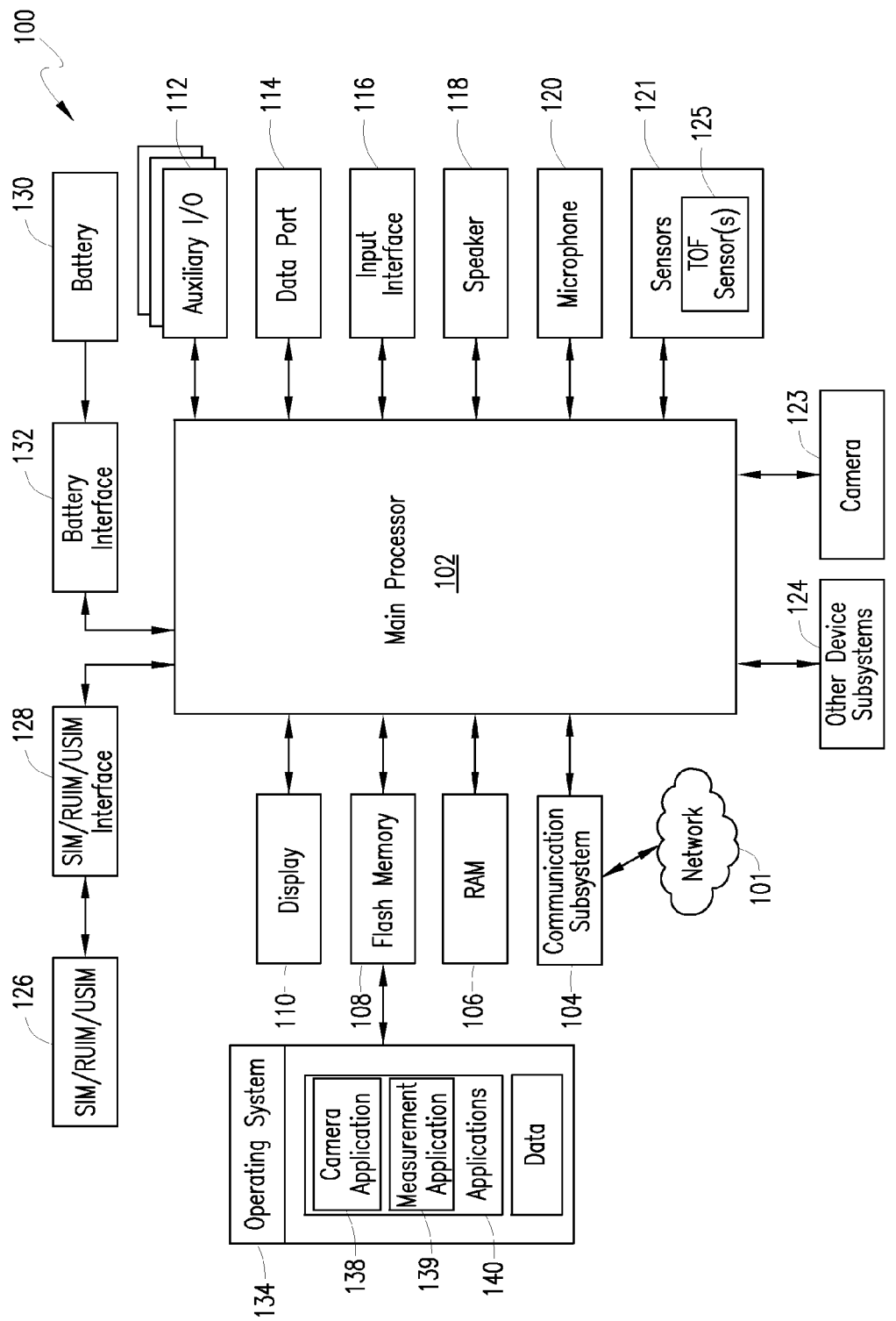
FIG. 1 depicts a block diagram of a mobile communication device according to an embodiment of the present patent disclosure.

The present patent disclosure is broadly directed to a mobile communication device that can provide accurate measurements from an image taken by a camera on the mobile communication device. Related thereto, also described is a method of providing measurements on a mobile communication device. Many users execute tasks that require accurate measurements for their completion. For example, building inspectors determine whether construction plans have been implemented according to specifications; policemen investigating an accident determine the length of skid marks; house painters determine the size of an area to be painted; and home-owners determine the size of windows that curtains must cover. Currently, to obtain the accuracy for these applications, the users need to carry a separate device that is capable of providing the measurements, whether that device is a physical measuring tool, such as a measuring tape, or an electronic device, such as a laser measuring device. It would be desirable to incorporate the ability to make accurate measurements into a mobile communication device, such as a mobile telephone or tablet, which many users carry with them at all times.

The present application discloses a mobile communication device that can take an image and also accurately determine a distance between the camera and at least one object represented in the image. In one embodiment, which is discussed in greater detail below, the determination is made using an optical time-of-flight sensor that measures the distance from the camera at the center of the image shown on the screen. Because the sensor uses light to determine the distance, the determination can be both fast and accurate. Other types of sensors or means of measuring can also be used and are discussed below.

In one embodiment of the present patent disclosure, a mobile communication device is disclosed. The mobile communication device comprises a processor operably coupled to a memory and to a wireless communication subsystem operable to send and receive data; a camera operably coupled to the processor; a sensor operably connected to provide to the processor a distance between the camera and an element viewable by the camera; and instructions stored in the memory that when executed by the processor perform the following: taking an image with the camera, using the sensor to determine a distance between the camera and at least one object recorded in the image, receiving a request for a desired measurement comprising one of a desired length measurement and a desired area measurement of an element in the image, calculating the desired measurement, and providing the desired measurement to the user.

In one embodiment of the present patent disclosure, a method of operating a camera in a mobile communication device is disclosed. The claimed embodiment comprises taking an image using the camera; determining a distance between the camera and at least one object recorded in the image using a sensor; receiving a request for a desired measurement comprising one of a desired length measurement and a desired area measurement of an element in the image; calculating the desired measurement; and providing the desired measurement to the user.

A mobile communication device and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale.

Referring now to the drawings, and more particularly to FIG. 1, an example mobile communication device is shown, which can be used to provide the disclosed measurements. Mobile communication device 100 can be any type of mobile communication device that includes a camera and a sensor that accurately determines a distance between the mobile communication device and an object whose image is being viewed. In the embodiment disclosed in FIG. 1, mobile communication device 100 is a wireless mobile telephone or tablet capable of operating in both wide-area cellular networks and in a variety of short-range networks, such as local area networks (LANs), WiFi, Bluetooth®, etc. Mobile communication device 100 can also be a personal digital assistant (PDA), e-reader, or other mobile electronic device that contains a camera. Mobile communication device 100 comprises a number of components such as a main processor 102 that controls the overall operation of mobile communication device 100. Communication functions, which include data communications and can also include voice communications, are performed through communication subsystem 104. Communication subsystem 104 receives messages from and sends messages to a wireless network 101. In this example embodiment of mobile communication device 100, communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behavior described herein. Persons skilled in the art will understand that the embodiments described herein are intended to use any other suitable standards that are developed in the future. The wireless link connecting communication subsystem 104 with wireless network 101 represents one or more different Radio Frequency (RF) channels, operating according to defined protocols specified for GSM/GPRS communications.

Main processor 102 also interacts with additional subsystems such as Random Access Memory (RAM) 106, flash memory 108, display 110, auxiliary input/output (I/O) subsystem 112, data port 114, input interface 116, speaker 118, microphone 120, camera 123, sensors 121, and other device subsystems 124. Sensors 121 can include an accelerometer, tilt sensor, proximity sensor, magnetometer, pressure sensor (none of which are specifically shown), as well as time-of-flight (TOF) sensor 125. The display 110 can be a touchscreen display able to receive inputs through a user's touch. Some of the subsystems of mobile communication device 100 perform communication-related functions, whereas other subsystems may provide "resident" or on-device functions. By way of example, display 110 and input interface 116 may be used for both communication-related functions, such as entering a text message for transmission over wireless network 101, and device-resident functions such as a calculator or task list.

Mobile communication device 100 can send and receive communication signals over wireless network 101 after required network registration or activation procedures have been completed. Network access is associated with a subscriber or user of mobile communication device 100. To identify a subscriber, mobile communication device 100 may use a subscriber module component or "smart card" 126, such as a Subscriber Identity Module (SIM), a Removable User Identity Module (RUIM) and a Universal Subscriber Identity Module (USIM). In the example shown, SIM/RUIM/USIM 126 is to be inserted into SIM/RUIM/USIM interface 128 in order to communicate with a network. Without the component 126, the mobile communication device 100 is not fully operational for communication with wireless network 101. Once SIM/RUIM/USIM 126 is inserted into SIM/RUIM/USIM interface 128, it is coupled to main processor 102.

Mobile communication device 100 is a battery-powered device and includes battery interface 132 for receiving one or more rechargeable batteries 130. In at least some embodiments, battery 130 can be a smart battery with an embedded microprocessor. Battery interface 132 is coupled to a regulator (not shown), which assists battery 130 in providing power to mobile communication device 100. Although current technology makes use of a battery, future technologies such as micro fuel cells may provide power to mobile communication device 100.

Turning now to look more closely at the TOF sensor, in one embodiment, time-of-flight (TOF) sensor 125 has been specifically designed to fit within the constraints of size and power consumption that are required in a mobile communication device such as a mobile telephone or tablet. In one embodiment, TOF sensor 125 is aligned to the camera so that TOF sensor 125 is measuring the distance between the camera and an object that appears at the center of the screen when the camera is turned on. A TOF sensor has both a transmitter and a receiver for a signal that is sent. In one embodiment, the signal is pulsed. In an alternate embodiment, the signal is modulated, with the sensor detecting a phase shift between outgoing and incoming signal in order to determine the distance to the object from which the signal was reflected. In at least one embodiment the sensor is accurate to within ±10 mm.

While TOF sensor 125 provides information for camera 123, the sensor is separate from camera 123. In one embodiment, TOF sensor 125 is activated whenever camera 123 is activated and will remain active as long as camera 123 is active. The rate at which TOF sensor reports distance measurements is adjustable and can be set to run at a rate that is equal to or greater than the frame rate of the camera. It will be understood that when the distance information provided by TOF sensor 125 is to be used to determine distances within an image, the distance information should be captured within the same time frame as the image. In one embodiment, both the distance measurements provided by TOF sensor 125 and the images provided by camera 123 are time-stamped so that they can be matched, although other means of matching measured distances with images can also be used. In at least one embodiment, those distance measurements that are associated with images are saved and stored with the images as metadata, so that measurements from the image can be determined at a later time, even if not originally requested. As the distance measurements are made, they are provided to processor 102, where they can be used by camera application 138 to set the focus of camera 123, by measurement application 139 as information to determine distances within an image, and by other applications that can be designed to use this information.

Mobile communication device 100 also includes an operating system 134 and applications 140, including camera application 138 and measurement application 139, which is described in more detail herein. Although camera application 138 and measurement application 139 are shown as separate entities in the drawing, one skilled in the art will appreciate that these two applications can be merged into a single application in other embodiments. Operating system 134 and the applications that are executed by main processor 102 are typically stored in a persistent store such as flash memory 108, which may alternatively be a read-only memory (ROM) or similar storage element (not shown). Those skilled in the art will appreciate that some portions of operating system 134 and applications 1409, such as specific device applications or parts thereof as well as data 140 relating to or associated with specific applications, may be temporarily loaded into a volatile store such as the RAM 106. Other software components can also be included, as is well known to those skilled in the art.

Other types of applications 140 can also be installed on mobile communication device 100. Software applications 140 can be pre-installed applications or third party applications that are added after the manufacture of mobile communication device 100. Examples of third party applications include games, calculators, utilities, etc. Additional applications 140 can be loaded onto mobile communication device 100 through at least one of the wireless network 101, auxiliary I/O subsystem 112, data port 114, short-range communications subsystem 122, or any other suitable device subsystem 124. Data port 114 can be any suitable port that enables data communication between mobile communication device 100 and another computing device. Data port 114 can be a serial or a parallel port. In some instances, data port 114 can be a USB port that includes data lines for data transfer and a supply line that can provide a charging current to charge battery 130 of mobile communication device 100.

For voice communications, received signals are output to speaker 118, and signals for transmission are generated by microphone 120. Although voice or audio signal output is accomplished primarily through speaker 118, display 110 can also be used to provide additional information such as the identity of a calling party, duration of a voice call, or other voice call related information.

In at least one embodiment of mobile communication device 100, camera 123 is a color camera configured to capture color images. Camera 123 includes an array or pixels to capture a received image, a filter system, one or more lens, and actuators that provide focus ability. More particularly, color camera 123 can include a color sensor that is capable of capturing color information of a scene to produce a color image. For example, the color sensor may include an image sensor and a color filter array. The image sensor receives and converts optical images into electronic signals that convey image information. The color filter array is a mosaic of tiny color filters placed over pixels of the image sensor to capture color information. The color filters filter light from a scene by wavelength range so that filtered wavelengths that provide corresponding color information are captured by different pixels on the image sensor. That is, a particular type of color information may be captured at a pixel of the image sensor based on the overlaying color filter. Accordingly, only certain amounts of incoming light are captured by the image sensor as the pixels only receive those portions of light that have been filtered based on color. The use of a color sensor results in a loss of image detail when compared to an achromatic sensor of a monochrome camera, as each pixel of the color sensor corresponds to only one particular color for filtering light. In at least one alternate embodiment, camera 123 is a monochrome camera.

Additionally, in at least one embodiment, camera 123 is equipped with an auto-focusing system. That is, camera 123 has the ability to change the lens position and/or optical image position with respect to the image sensor in order to focus on an image. In such cases, as part of the auto-focusing system, the camera may include components (such as actuators) that may move the lens in relation to the image sensor in order to focus on an image. In one embodiment, the auto-focusing system receives distance measurements from TOF sensor 125, which is used to set the focus in a one-step process. That is, given the distance to the object at the center of the image, the actuator can take the lens to a position that is known to give the correct focus. In another embodiment, the distance is used to position the lens at the determined location, then the focus at the selected location can be checked against, for example, the focus at one step in either direction from the determined location to ensure that the optimum focus has been obtained. This latter process can be used, for example, to compensate for slight differences in manufacturing processes.

Measurement application 139 can be configured to control options or features associated with camera 123. For example, measurement application 139 can trigger the camera and choose specific camera modes. In at least one embodiment, measurement application 139 is configured to control a flash associated with camera 123. In at least one embodiment, measurement application 139 is configured to allow camera 123 to focus on a subject (i.e. an identifiable item, such as an individual or thing). For example, camera 123 may be configured to control actuators to move one or more lens elements in camera 123 relative to the image sensors in camera 123, i.e. vary the focal lengths of camera 123. For example, TOF sensor 125 continually provides a signal containing the distance to an object at the center of the field of view of camera 123. Camera application 138 uses the signal to set the focus of the camera.

Figure 2:
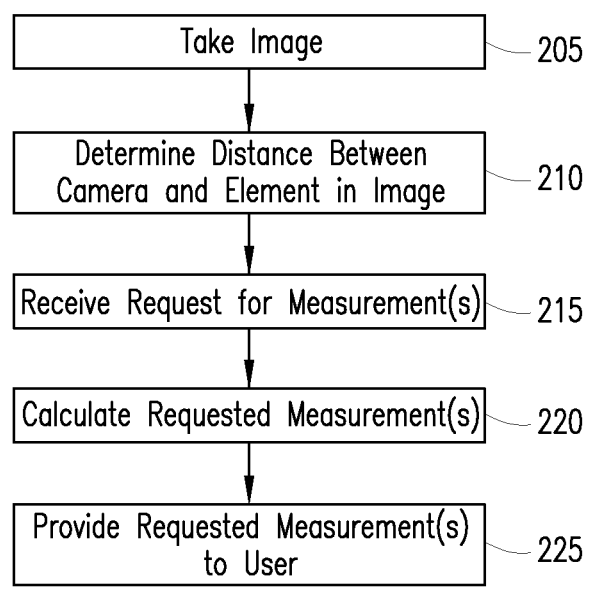
FIG. 2 depicts a method of providing accurate measurements using an image taken by a camera on a mobile communication device according to an embodiment of the present patent disclosure.

Operation of measurement application 138 will now be discussed with reference to FIG. 2, which discusses the process that takes place. At element 205, camera 123 takes an image of a scene that is being viewed on display 110 and at element 210, the distance between the camera and at least one element in the image is determined. Although these elements are shown as being performed sequentially, the distance is determined during the time frame that the image is being recorded. As noted, time-stamps or other mechanisms can be used to ensure that the distance and image are matched to each other. In at least one embodiment, TOF sensor 125 is actively involved in determining the focal distance whenever the camera application is available. Accordingly, TOF sensor 125 is able to measure the distance from the camera at the time the image is taken and make that distance available to measurement application 139. In at least one embodiment, whenever a picture is taken or a video recorded, distance information from TOF sensor 125 is stored as metadata with each image, allowing measurements to be made on any images recorded by camera 123 on mobile communication device 100. In other embodiments, the distance information is stored only when measurement application 139 has been invoked prior to taking the image. In at least one embodiment, time-of-flight sensor 125 determines the distance from the camera to a point that is at the center of the image being recorded. In this embodiment, measurement application 139 calculates distances within the image using the assumption that elements in the image are generally planar with the element that is at the center point of the image. However, even in this embodiment, measurement application 139 can make various adjustments to the image and/or calculations using known techniques and/or information from additional sensors, as will be discussed in greater detail below.

In other embodiments, multiple TOF sensors can be implemented in mobile communication device 100 to measure distance from the camera to multiple points within the image area. For example, many cameras today use variations of a Bayer filter to record color images. In a Bayer filter, red, blue and green filters are arranged in a pattern such that adjacent pixels in the camera receive light filtered with different colors. The images created using the Bayer filter are then combined in known ways to provide the color image. Currently, green filters are associated with half of the pixels in a Bayer filter, with blue and red filters each being associated with one quarter of the pixels. In one embodiment, half of the green-filtered pixels, are replaced with a receiver for TOF sensor 125 to capture distance across the image. It is theoretically possible to use every pixel in the image to capture distance from the camera, with the capture of distance occurring either in two operations—one to capture the image and one to capture the distances—or simultaneously. These more advanced implementations would currently require a larger, heavier device with greater power consumption than users of mobile devices would generally accept, but as the technology continues to evolve, can be a reality in the future.

At element 215, measurement application 139 receives a request to provide a measurement from the image on mobile communication device 100. This request can be received in various formats. In one example of the disclosed method, the user activates a selection that displays a gauge or calipers that the user can position to enclose the element in the image that is to be measured. In another example, the user draws a line with a stylus to indicate the distance that is to be measured. Dedicated applications can implement sub-programs that provide specific types of measurements that are common to a given task, as will be explained in greater detail below. In embodiments where an area measurement is requested, measurement application 139 can provide shapes that can be manipulated to overlay or outline the desired area to be measured. For example, a rectangular outline can be dropped over the desired area, with drag and drop capabilities to shrink or stretch the outline to enclose the region to be measured. One skilled in the art will recognize that other means of designating the distance or area within the image that is to be measured are possible.

Once measurement application 139 receives the measurement request 215, measurement application 139 calculates an answer to the request 220. Measurement application 139 can easily determine the number of pixels that extend along the line drawn or are enclosed by the displayed calipers or enclosing shape. Measurement application 139 can also determine the field of view that is captured by camera 123. A typical field of view for a mobile communication device is 70 degrees across the diagonal, although this number will vary slightly with movement of the lens during focusing. Once measurement application 139 knows the exact location of the lens, the measurement program can determine the exact field of view. Given the number of pixels in the desired measurement, the field of view and the measured distance to the center of the image, measurement application 139 calculates at 220 the answer to the requested figure, i.e., the actual length or area that has been requested. Once the answer has been calculated, measurement application provides the answer to the user at 225. Typically, the answer will be provided on the display, although it will be understood that the answer can be provided in other ways, e.g., by a verbalization of the answer using the speakers.

Several examples of specific uses of the disclosed method will now be described. These are intended only as examples and should not be taken as limiting the claimed embodiments. In one implementation, a building inspector can use the disclosed measurement application to quickly make and record measurements, such as distances between support structures. In one example implementation, the measurement application provides a selection that includes spacing between uprights. When this option is selected by the user, the measurement program can recognize the shapes that it is supposed to measure; when the camera is aimed at the structures to be measured, the measurement application can be programmed to automatically take the image and provide appropriate measurements, e.g., from center of one upright to center of the next upright. The measurements can be displayed to the user and maintained as part of the photograph, if desired.

In another implementation, images at the site of an automobile accident can be used to measure the length of skid marks, for example. For the implementation in which a single TOF sensor is used in the mobile communication device, corrective measures can be provided for those situations in which it is not possible to take the image from a position that is square-on to the object that is being measured. For example, it is known to use a "keystone correction" with projection devices when it is not possible to position the projector square to the surface on which the image is being projected. A similar correction can be made in measurement application 139 by asking the user to provide adjustments to the image, e.g., by moving a slider on the display, until the object to be measured appears to be square on to the viewer. Measurement application 139 can use the adjustments that were made by the user to provide more accurate calculations of distance within the image. In cameras that are operable to take panoramic views or video, TOF sensor 125 can be used in combination with other sensors, such as an accelerometer, during recording of the panoramic view or video. Images that include movement of the mobile device can be used with continuing distance measurements made during recording to provide more accurate measurements within the recorded image.

Measurement application 139 can be implemented in a variety of ways. For example, measurements can be provided as an option in a basic camera application, e.g., by providing a button, drop-down menu or other activation mechanism. Measurement application 138 can also be provided as a downloadable application or "ap", either by the manufacturer or by a third party.

Various processes, structures, components and functions set forth above in detail, associated with one or more embodiments of a measurement application, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a non-transitory computer-accessible media, uploadable service application software, or software downloadable from a remote station or service provider, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. In one embodiment, transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:
1. A mobile communication device comprising:
    a processor operably coupled to a memory and to a wireless communication subsystem operable to send and receive data;
    a camera operably coupled to the processor;
    a sensor operably connected to provide to the processor a distance between the camera and an element viewable by the camera;
    instructions stored in the memory that when executed by the processor perform the following:
        taking an image with the camera,
        using the sensor to determine a distance between the camera and at least one object recorded in the image,
        time-stamping when the image was taken and when the distance was determined,
        storing the distance data with the image as metadata, receiving, at a later time, a request for a desired measurement comprising one of a desired length measurement or a desired area measurement of an element in the image, calculating the desired measurement using the stored time-stamped image and the distance data, wherein using the time-stamped image includes determining a number of pixels identified in the request, and a field of view, and providing the desired measurement to the user.

2. The mobile communication device according to claim 1 wherein the sensor determines the distance to an accuracy of plus or minus 10 mm.

3. The mobile communication device according to claim 2 wherein the sensor is an optical time-of-flight sensor.

4. The mobile communication device according to claim 1, wherein the sensor operates independently of the camera.

5. The mobile communication device according to claim 4 wherein the sensor is active whenever the camera is active.

6. The mobile communication device according to claim 5, wherein the sensor is aligned with a center of view of the camera.

7. The mobile communication device according to claim 6 wherein the distance is used to set a focus of the camera.

8. The mobile communication device according to claim 7 wherein the sensor determines distance at a rate that is greater than or equal to a camera frame rate.

9. The mobile communication device according to claim 1 wherein the instructions, when executed by the processor, further perform: receiving a correction to the image via user input and using the received correction to calculate the desired measurement.

10. The mobile communication device according to claim 9 wherein the correction is a keystone correction.

11. The mobile communication device according to claim 1, wherein providing the desired measurement to the user comprises displaying the desired measurement on a screen of the mobile communication device.

12. A method of operating a camera in a mobile communication device, the method comprising:

taking an image using the camera;

determining a distance between the camera and at least one object recorded in the image using a sensor;

time-stamping when the image was taken and when the distance was determined;

storing the distance data with the image as metadata;

receiving, at a later time, a request for a desired measurement comprising one of a desired length measurement or a desired area measurement of an element in the image;

calculating the desired measurement using the stored time-stamped image and the distance, wherein using the time-stamped image includes determining a number of pixels identified in the request, and a field of view; and providing the desired measurement to the user.

13. The method according to claim 12 further comprising applying a correction to the image prior to calculating the measurement.

14. The method according to claim 13 further comprising receiving a keystone correction to the image from the user.

15. The method according to claim 12 wherein the sensor is a time-of-flight sensor that determines a distance from the camera of an object at the center of the field of view.

16. The method according to claim 12 wherein providing the desired measurement comprises displaying the measurement on a screen.

17. The method according to claim 16 wherein receiving the request for a measurement comprises receiving input from a stylus on the screen.

* * * * *